(12) United States Patent
Kumar et al.

(10) Patent No.: US 10,405,377 B2
(45) Date of Patent: Sep. 3, 2019

(54) COOKING VESSEL FOR AN INDUCTION COOKTOP

(71) Applicant: Wipro Limited, Bangalore (IN)

(72) Inventors: Vijay Kumar, Bangalore (IN); Ramya Kolli, Andhra Pradesh (IN); Shagun Rai, Uttar Pradesh (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/085,666

(22) Filed: Mar. 30, 2016

(65) Prior Publication Data
US 2017/0280914 A1    Oct. 5, 2017

(30) Foreign Application Priority Data
Mar. 29, 2016    (IN) .............................. 201641010893

(51) Int. Cl.
*H05B 6/06*    (2006.01)
*A47J 27/62*    (2006.01)
*H05B 6/12*    (2006.01)
*A47J 27/56*    (2006.01)

(52) U.S. Cl.
CPC .............. *H05B 6/062* (2013.01); *A47J 27/56* (2013.01); *A47J 27/62* (2013.01); *H05B 6/12* (2013.01); *H05B 2213/06* (2013.01)

(58) Field of Classification Search
CPC .. A47J 27/004; A47J 43/0465; A47J 43/0777; A47J 43/085; A47J 27/62; A47J 27/64; B01F 13/045; B01F 13/0872; B01F 15/00175; B01F 13/0827–089; H05B 6/062; H05B 6/12

USPC ........... 219/621, 626, 627; 99/348, 326, 342
See application file for complete search history.

(56) References Cited

U.S. PATENT DOCUMENTS

| | | | |
|---|---|---|---|
| 3,989,916 A | * | 11/1976 | Amagami ............. H02M 7/523 219/622 |
| 4,499,368 A | | 2/1985 | Payne |
| 8,191,468 B2 | | 6/2012 | Malek Azary |
| 2012/0000903 A1 | * | 1/2012 | Baarman ............... A47J 27/002 219/620 |

(Continued)

FOREIGN PATENT DOCUMENTS

JP           H08210646 A       8/1996

*Primary Examiner* — Tu B Hoang
*Assistant Examiner* — Erin E McGrath
(74) *Attorney, Agent, or Firm* — Pepper Hamilton LLP

(57) ABSTRACT

The present disclosure relates to a cooking vessel for induction cooktops. The cooking vessel comprises at least one movable magnetic material base plate provided at heat conducting zone of the cooking vessel, wherein the movable magnetic material base plate transfers heat from the induction cooktop to contents in the cooking vessel. The cooking vessel further comprises at least one non-magnetic material base plate, placed adjacent to the at least one movable magnetic material base plate, wherein the non-magnetic material base plate blocks transfer of heat from induction cooktop to the contents. Further, an insulation pocket, placed adjacent to the at least one movable magnetic material base plate, is configured to house the at least one movable magnetic material base plate. Furthermore, an actuator is configured to displace the at least one movable magnetic material base plate from the heat conducting zone to the insulation pocket based on a control signal.

17 Claims, 5 Drawing Sheets

(56) References Cited

U.S. PATENT DOCUMENTS

| | | | | |
|---|---|---|---|---|
| 2013/0001220 A1* | 1/2013 | Alet Vidal | ............ | A47J 43/0465 |
| | | | | 219/622 |
| 2013/0139704 A1* | 6/2013 | Schilling | ............... | A47J 27/002 |
| | | | | 99/331 |
| 2013/0264333 A1* | 10/2013 | Alipour | ................... | H05B 6/12 |
| | | | | 219/621 |
| 2014/0083304 A1* | 3/2014 | He | ........................ | A47J 43/044 |
| | | | | 99/348 |
| 2014/0217090 A1* | 8/2014 | Fryshman | .............. | H05B 6/105 |
| | | | | 219/621 |
| 2015/0312969 A1* | 10/2015 | Hazir | .................. | H05B 6/1236 |
| | | | | 219/621 |
| 2015/0319812 A1* | 11/2015 | Fryshman | .............. | H05B 6/105 |
| | | | | 219/621 |

* cited by examiner

COOKING VESSEL FOR AN INDUCTION COOKTOP

This application claims the benefit of Indian Patent Application Serial No. 201641010893, filed Mar. 29, 2016, which is hereby incorporated by reference in its entirety.

FIELD

The present subject matter is related, in general to induction cooking, and more particularly, but not exclusively to a cooking vessel for an induction cooktop.

BACKGROUND

Induction cooking is a method of cooking using an induction cooktop. The induction cooktop heats a cooking vessel by magnetic induction instead of thermal conduction. With the advent of induction cooktops, people have switched from traditional cooktops that used to consume large amount of fuel and/or gas to the electric induction cooktops. The electrical energy supplied to the induction cooktop is directly transferred to cooking vessels using magnetic fields, thereby reducing wastage of energy.

Typically, one of the main problems faced by the people while using the induction cooktops is spilling over of food contents and/or the food contents getting over-cooked. Also, there's always a manual intervention required to use the induction cooktops. It happens many a times that a person, using the induction cooktop, keeps the food contents to boil/cook on the induction cooktop and forgets it. Eventually, the food contents spill over/boil over due to excessive heat supplied by the induction cooktop. Hence, the manual intervention of the person is necessary for turning off the flame/heat to avoid the spilling over/boiling over of the food contents in the cooking vessel.

The conventional approaches use a heat control means that turns off the heat source when the temperature of the cooking article in a cooking pan has reached a predetermined temperature, thereby limiting the supply of heat to the cooking pan.

However, the methods of cooking explained in the conventional approaches are controlled solely based on the heat and/or temperature of the food contents in the cooking vessel. Also, determining the status of the food contents requires extra efforts since different ingredients of the food contents may have different temperature values at which they get burnt.

The issue mainly faced in induction cooktop is spilling over of food contents and/or the food contents getting over-cooked and also there's always a manual intervention required to use the induction cooktops to avoid the spill over.

SUMMARY

Disclosed herein is a cooking vessel for induction cooktops. The cooking vessel detects when food contents present in the cooking vessel are being boiled and reach a predetermined level in the cooking vessel. The cooking vessel cuts off the heat supplied from the induction cooktop to avoid spilling over of the food contents when the food contents reach the predetermined level in the cooking vessel. The cooking vessel also comprises a stirring technique to prevent the food contents from burning and/or sticking to bottom of the cooking vessel.

Accordingly, the present disclosure relates to a cooking vessel for induction cooktops. The cooking vessel comprises at least one movable magnetic material base plate provided at a heat conducting zone of the cooking vessel, wherein the movable magnetic material base plate transfers heat from the induction cooktop to contents in the cooking vessel, the remainder of the vessel shall be made of a thermally conductive non-magnetic material. The cooking vessel further comprises at least one non-magnetic material base plate placed adjacent to the at least one movable magnetic material base plate, wherein the non-magnetic material base plate blocks transfer of heat from the induction cooktop to the contents. Further, an insulation pocket, placed adjacent to the at least one movable magnetic material base plate, is configured to house the at least one movable magnetic material base plate. Furthermore, an actuator is configured to displace the at least one movable magnetic material base plate from the heat conducting zone to the insulation pocket based on a control signal.

Further, the present disclosure relates to a method of monitoring cooking status in a cooking vessel. The method comprises receiving, by an actuator configured in the cooking vessel, a control signal. The actuator displaces at least one movable magnetic material base plate, provided at a heat conducting zone of the cooking vessel, from the heat conducting zone to an insulation pocket, placed adjacent to the at least one movable magnetic material base plate, based on the control signal.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1A:
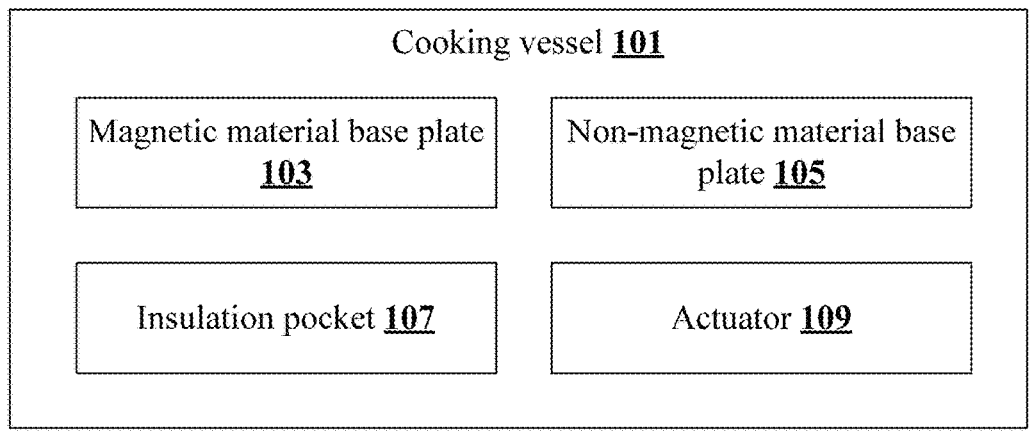
FIGS. 1a and 1b show detailed block diagrams illustrating a cooking vessel for induction cooktops in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a cooking vessel for induction cooktops. The cooking vessel comprises at least one movable magnetic material base plate provided at a heat conducting zone of the cooking vessel, wherein the movable magnetic material base plate transfers heat from the induction cooktop to contents in the cooking vessel, the remainder of the vessel shall be made of thermally conductive non-magnetic material. The cooking vessel further comprises at least one non-magnetic material base plate placed adjacent to the at least one movable magnetic material base plate, wherein the non-magnetic material base plate blocks transfer of heat from the induction cooktop to the contents. Further, an insulation pocket, placed adjacent to the at least one movable magnetic material base plate, is configured to house the at least one movable magnetic material base plate. Furthermore, an actuator is configured to displace the at least one movable magnetic material base plate from the heat conducting zone to the insulation pocket based on a control signal. The at least one non-magnetic material base plate covers the heat conducting zone of the cooking vessel upon displacement of the at least one movable magnetic material into the insulation pocket, thereby blocking the heat supply and hence prevents the spillover of the contents in the cooking vessel.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1B:
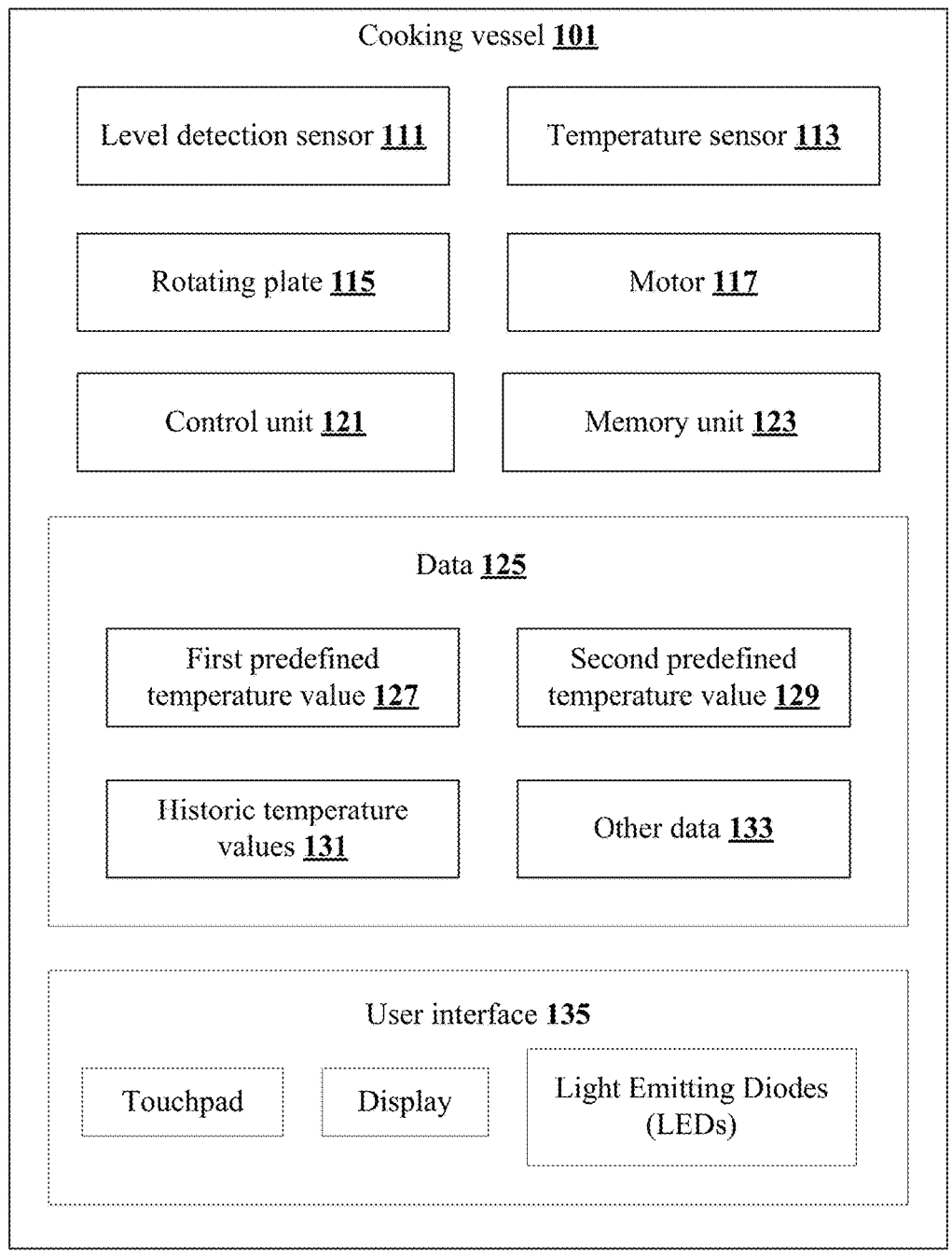

FIGS. 1a and 1b show detailed block diagrams illustrating a cooking vessel for induction cooktops in accordance with some embodiments of the present disclosure.

In an implementation, the cooking vessel 101 comprises at least one movable magnetic material base plate 103, at least one non-magnetic material base plate 105, an insulation pocket 107 and an actuator 109. In an embodiment, the cooking vessel 101 shall have all the features of any usual cooking vessel 101 and shall have all the capabilities that are necessary for cooking any food content. Additionally, the cooking vessel 101 may accommodate all the components described in the disclosure, for monitoring the cooking status of the contents in the cooking vessel 101.

In an embodiment, the movable magnetic material base plate 103 used in the cooking vessel 101 may be made of any ferromagnetic (or ferrous) material such as, iron, nickel, cobalt, alloys of rare earth metals and naturally occurring minerals such as lodestone. The ferromagnetic materials are those, which may be easily magnetized and which are strongly attracted to a magnet. In an implementation, the movable magnetic material base plate 103 may be provided at a heat conducting zone of the cooking vessel 101 for transferring heat from the induction cooktop to the contents in the cooking vessel 101, thereby cooking the contents.

In an embodiment, the non-magnetic material base plate 105 used in the cooking vessel 101 may be made of any non-ferromagnetic (or non-magnetic or non-ferrous) materials such as, aluminium, alloys of aluminium, brass, copper and silver. The non-ferromagnetic materials are those which are non-magnetic. The non-magnetic material base plate 105 may be placed adjacent to the at least one movable magnetic material base plate 103 for blocking the transfer of heat from the induction cooktop to the contents. The non-magnetic material base plate 105 comes in place of the movable magnetic material base plate 103 when the movable magnetic material base plate 103 is displaced into the insulation pocket 107, thus blocking the heat supply from the induction cooktop. In an implementation, the movable magnetic material base plate 103 and the non-magnetic material base plate 105 may be placed adjacent and/or connected to each of other using a thermally conductive and electrically insulating material, such as, but not limited to, mica sheets and certain epoxy resins, in order to interchange the position of the non-magnetic material base plate 105 and the movable magnetic material base plate 103.

In an embodiment, the insulation pocket 107, in the cooking vessel 101 may be made of a thermally and electrically non-conductive material, for example, rubber. In an implementation, the insulation pocket 107 may be placed adjacent to the movable magnetic material base plate 103 and may be configured to house the movable magnetic material base plate 103. Further, the insulation pocket 107 houses the movable magnetic material base plate 103 only when the actuator 109 displaces the movable magnetic material base plate 103. The expression "configured to" referred above means "being capable of". For example, the insulation pocket 107 configured to house the movable magnetic material base plate 103 means that the insulation pocket 107 is capable of housing the movable magnetic material base plate 103 as and when required. In other words, the insulation pocket 107 does not house the movable magnetic material base plate 103 always. The insulation pocket 107 insulates the movable magnetic material base plate 103 when the movable magnetic material base plate 103 is housed in the insulation pocket 107.

In an embodiment, the actuator 109 in the cooking vessel 101 may be configured to displace the movable magnetic material base plate 103 from the heat conducting zone to the insulation pocket 107 based on a control signal. In an implementation, the actuator 109 may comprise a mechanical spring component, such that one end of the spring component is connected to the movable magnetic material base plate 103 for displacing the movable magnetic material base plate 103. The other end of the spring component may be connected to a motor, such that, the motor causes the spring component to displace the movable magnetic material base plate 103 when the actuator 109 receives the control signal. In one embodiment, the movable magnetic material base plate 103 may be displaced in a linear direction. In another embodiment, the movable magnetic material base plate 103 may be displaced in a non-linear direction. The actuator 109 actuates the displacement of the movable magnetic material base plate 103 into the insulation pocket 107 only upon receiving a control signal. The control signal may be generated by at least one of the level detection sensor 111, the temperature sensor 113 and one or more switches configurable in the cooking vessel 101. In one embodiment, the level detection sensor 111, the temperature sensor 113 and the one or more switches are detachable.

In an implementation, the cooking vessel 101, in addition to the components explained herein above, may comprise a level detection sensor 111, a temperature sensor 113, a rotating plate 115, a motor 117, the control unit 121, a memory unit 123 comprising data 125, and user interface 135. In one embodiment, the data 125 may comprise, without limitation, the first predefined temperature value 127, the second predefined temperature value 129, the historic temperature values 131 and other data 133. The data 125 may be stored within the memory unit 123 in the form of various data structures. Additionally, the aforementioned data 125 can be organized using data models, such as relational or hierarchical data models. The other data 133 may store data, including temporary data and temporary files, generated by the components of the cooking vessel 101.

In an embodiment, the level detection sensor 111 may be used for detecting the level of contents being cooked in the cooking vessel 101. The level detection sensor 111 may include, without limitation, one of various Line-of-Sight (LOS) transceivers, including an Infrared (IR) transceiver, a Laser device, and a fluid level sensor. For example, when the LOS transceivers are used as the level detection sensor 111, detect a change and/or increase in the level of the contents which obstructs path (or line-of-sight) between a transmitter LOS component and a receiver LOS component. In one implementation, the level detection sensor 111 may be placed at brim of the cooking vessel 101 and may be movable across the length of the cooking vessel 101 for allowing a user to set a predefined threshold level. Further, both the transmitter LOS components and the receiver LOS component may be physically connected with a metallic structure, inside the walls of the vessel, so that when they are moved they shall move as a single unit.

The predefined threshold level is the level up to which the contents are allowed to reach during cooking. Further, the level detection sensor 111 may generate a first signal upon determining the level of the contents reaching a predefined threshold level.

The temperature sensor 113 may be used to measure/determine the temperature of the contents in the cooking vessel 101. In an embodiment, the temperature sensor 113 may be configured in lower middle part of the cooking vessel 101, such that the temperature sensor 113 is placed on the inner wall of the cooking vessel 101. The temperature sensor 113 generates a second signal upon determining the temperature value of the contents in the cooking vessel 101 reaching a first predefined temperature value 127. As an example, the first predefined temperature value 127 may be 100° Celsius. Here, the temperature sensor 113 transmits the second signal to the control unit 121 when the temperature value of the contents present in the cooking vessel 101 is higher than 100° Celsius.

In an embodiment, the rotating plate 115 in the cooking vessel 101 may be used for stirring the contents present in the cooking vessel 101 when the temperature value of the contents reaches a second predefined temperature value 129. In an implementation, the rotating plate 115 is rotated using the motor 117 connected to the rotating plate 115 and the rotating plate 115 comprises one or more vertical protrusions. The contents in the cooking vessel 101 are stirred with the movement of the one or more vertical protrusions, thereby preventing the contents from sticking to the bottom of the cooking vessel 101. In an implementation, the vertical protrusions on the rotating plate 115 may rotate in a circular path, such as concentric path to effectively emulate the stirring process.

In an embodiment, the motor 117 is an electric motor that is connected to the rotating plate 115 for rotating the rotating plate 115. The motor 117 rotates the rotating plate 115 when the temperature value of the contents present in the cooking vessel 101 reaches the second predefined temperature value 129. In an embodiment, the motor 117 shall be activated by a manual input switch.

In an embodiment, the control unit 121 is a central processing unit ("CPU" or "processor") in the cooking vessel 101. The control unit 121 may include specialized processing units such as integrated system (bus) controllers, memory management control units, floating point units, graphics processing units, digital signal processing units, etc. Further, the control unit 121 may be disposed in communication with the memory unit 123.

In an embodiment, the control unit 121 may be configured to generate the control signal based on the first signal from the level detection sensor 111 and/or the second signal from the temperature sensor 113. The control signal generated by the control unit 121 are received by the actuator 109, wherein the actuator 109 displaces the movable magnetic material base plate 103 from the heat conducting zone to the insulation pocket 107 based on the control signal.

In an embodiment, the memory unit 123 may store one or more data 125. The memory unit 123 may include, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI) and the similar. The memory unit 123 may also store a collection of program or database components, including, without limitation, a User Interface (UI) application and an operating system.

In an embodiment, the first predefined temperature value 127 is the maximum temperature value up to which the contents in the cooking vessel 101 may be allowed to heat. As an example, the first predefined temperature value 127 may be 100° Celsius. The temperature sensor 113 determines the temperature value of the contents and generates the second signal when the temperature value of the contents has reached the first predefined temperature value 127, i.e., 100° Celsius. Now, the second signal generated by the temperature sensor 113 causes the actuator 109 to displace the movable magnetic material base plate 103 into the insulation pocket 107, thereby limiting/blocking the heat supplied to the contents. In an embodiment, the first predefined temperature value 127 may be provided by the user.

In another embodiment, the control unit 121 may set the first predefined temperature value 127 based on the historic temperature value at which boil over condition of the contents present in the cooking vessel 101 was detected in the past.

In an embodiment, the second predefined temperature value 129 is the temperature value at which the contents in the cooking vessel 101 have to be stirred. As an example, the second predefined temperature value 129 provided by the user may be 50° Celsius. The motor 117 connected to the rotating plate 115 rotates the rotating plate 115 when the temperature value of the contents has reached the second predefined temperature value 129, i.e., 50° Celsius. In an embodiment, the second predefined temperature value 129 may be provided by the user. In another embodiment, the control unit 121 may set the second predefined temperature value 129 based on the historic temperature value at which stirring of the contents present in the cooking vessel 101 is performed in the past.

In an embodiment, the historic temperature values 131 are the temperature values stored in the memory unit 123 of the cooking vessel 101, wherein the historic temperature values 131 include the temperature values at which the boil over condition was detected. In an embodiment, the control unit 121 may use the historic temperature values 131 for setting the first and/or second predefined temperature values 127, 129 when the first and/or second predefined temperature values 127, 129 are not received from the user.

In an embodiment, the user interface 135 of the cooking vessel 101 may be used for receiving various inputs from the user. The inputs received from the user may comprise, without limitation, a first predefined temperature value 127 and a second predefined temperature value 129. In an implementation the user interface 135 may comprise one or more keys/buttons or a touch screen, a display area and one or more Light Emitting Diodes (LEDs). The user interface 135 may further comprise one or more switches/trigger buttons (not shown in the figure) that generate the control signal when activated by the user. These one or more switches/trigger buttons may be used for a manual activation of the actuator 109. Further, one of the one or more switches/trigger buttons in the user interface 135 may be used for the activation of the motor 117, which in turn activates the rotating plate 115. The display may be used for displaying one or more status of the contents and/or the cooking vessel 101. In an embodiment, the one or more status of the cooking vessel 101 comprises, without limitation, the boil over status, the stirring status, the position of the movable magnetic material base plate 103 and the position of the level detection sensor 111. In another embodiment, the one or more LEDs may be used for representing the one or more status of the cooking vessel 101.

Figure 2A:
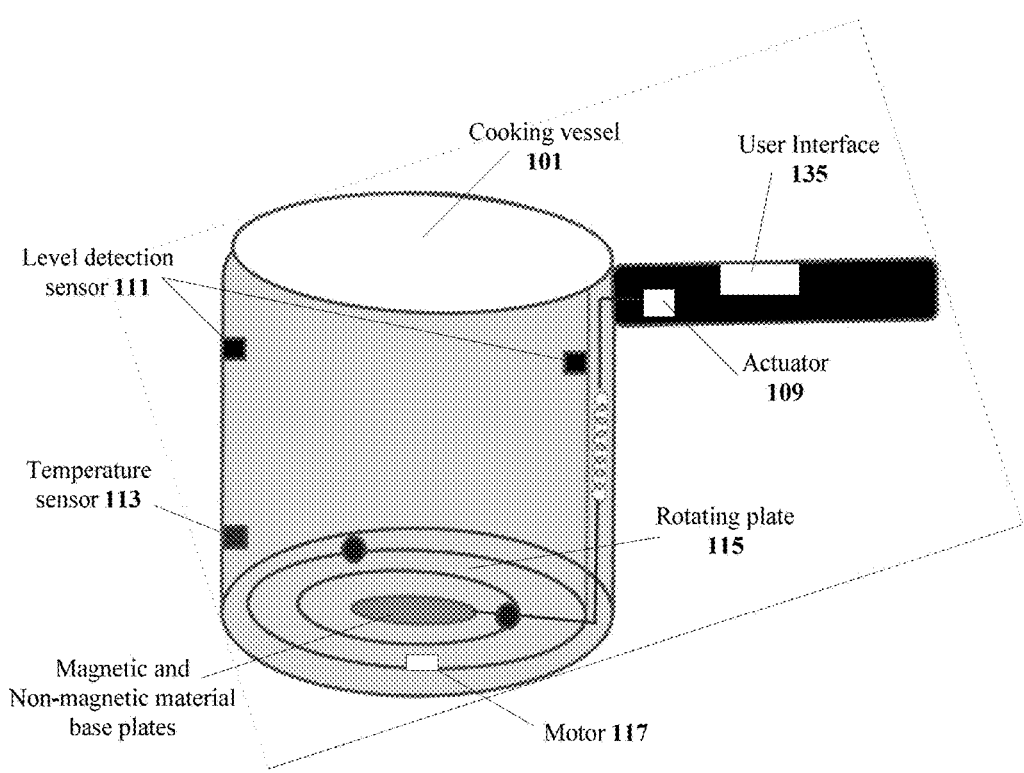
FIG. 2a shows front view of the cooking vessel for the induction cooktops in accordance with some embodiments of the present disclosure.
Figure 2B:
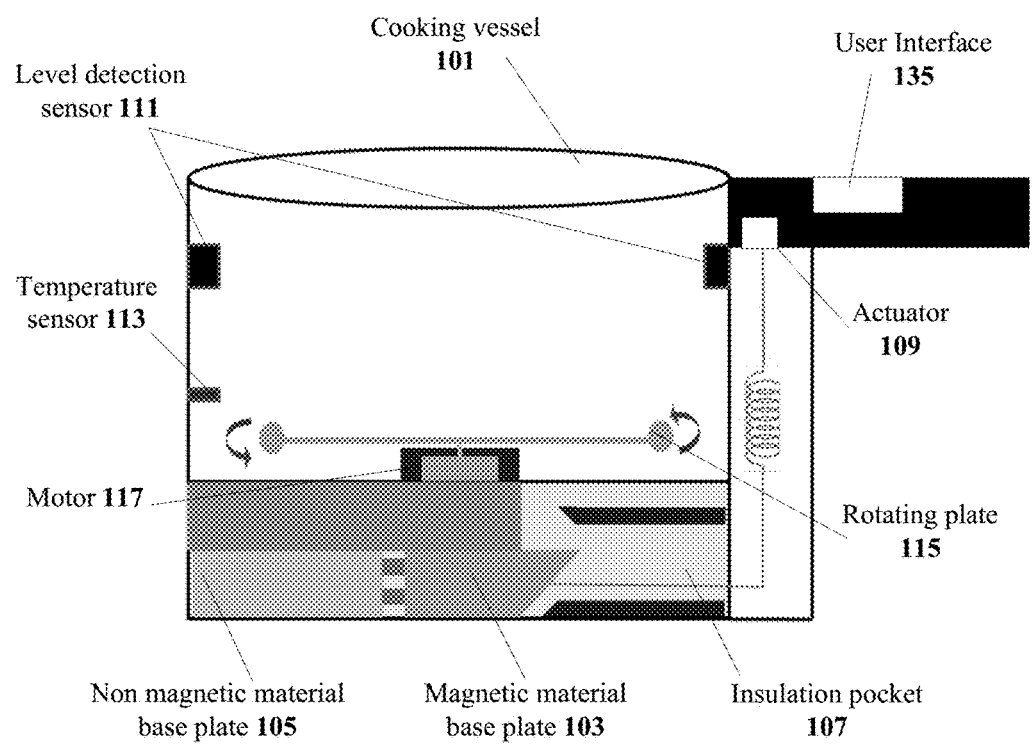
FIG. 2b shows the sectional view of the cooking vessel for the induction cooktops in accordance with some embodiments of the present disclosure.

FIG. 2a and FIG. 2b show exemplary views of the one or more components in the cooking vessel in accordance with some embodiments of the present disclosure.

Initially, the user may set the predefined threshold level for monitoring the boil over of the contents in the cooking vessel 101 by placing/moving the level detection sensor 111 along the length of the cooking vessel 101 to a required level. The level detection sensor 111 senses the boiling over of the contents and generates a first signal to activate the changeover in the position of the movable magnetic material base plate 103 and the non-magnetic material base plate 105 at the bottom of the cooking vessel 101. The temperature sensor 113 measures the temperature of the contents in the cooking vessel 101 and generates a second signal when the temperature value of the contents has reached the first predefined temperature value 127.

The control unit 121 (not shown in FIG. 2a) transmits a control signal to the actuator 109 based on either the first signal or the second signal generated by the level detection sensor 111 and the temperature sensor 113 respectively. Alternatively, the one or more switches or the push buttons (not shown in FIG. 2a) on the cooking vessel 101 may be used for manually transmitting the control signal to the actuator 109. The actuator 109, upon receiving the control signal from either of the control unit 121 or the one or more switches, displaces the movable magnetic material base plate 103 into the insulation pocket 107. Therefore, the non-magnetic material base plate which is placed adjacent to the magnetic material base plate comes in place of the magnetic material base plate which blocks the supply of the heat to contents in the cooking vessel thereby avoiding transfer of heat to the contents beyond the required level resulting into avoidance of spill over of the contents.

Additionally, the motor 117 connected to the rotating plate 115 in the bottom of the cooking vessel 101 rotates the rotating plate 115 when the temperature value of the contents has reached the second predefined temperature value 129. The rotating plate 115 comprises one or more vertical protrusions, which cause the stirring of the contents when the rotating plates 115 are rotated by the motor 117.

Further, the cooking vessel 101 may be configured with a self-learning technique, which shall remember the boil over points from previous boil over situations and shall adapt accordingly in absence of the predefined values from the user. The control unit 121 may set the first predefined temperature value 127 and the second predefined temperature value 129 which are pre-stored using the self-learning techniques.

In an embodiment, the cooking vessel 101 may also comprise a notification component for notifying one or more status of the cooking vessel 101. As an example, a notification may be provided as an audible alarm and/or as a message to a computing device associated with the user when the boil over of the contents is detected.

Figure 3:
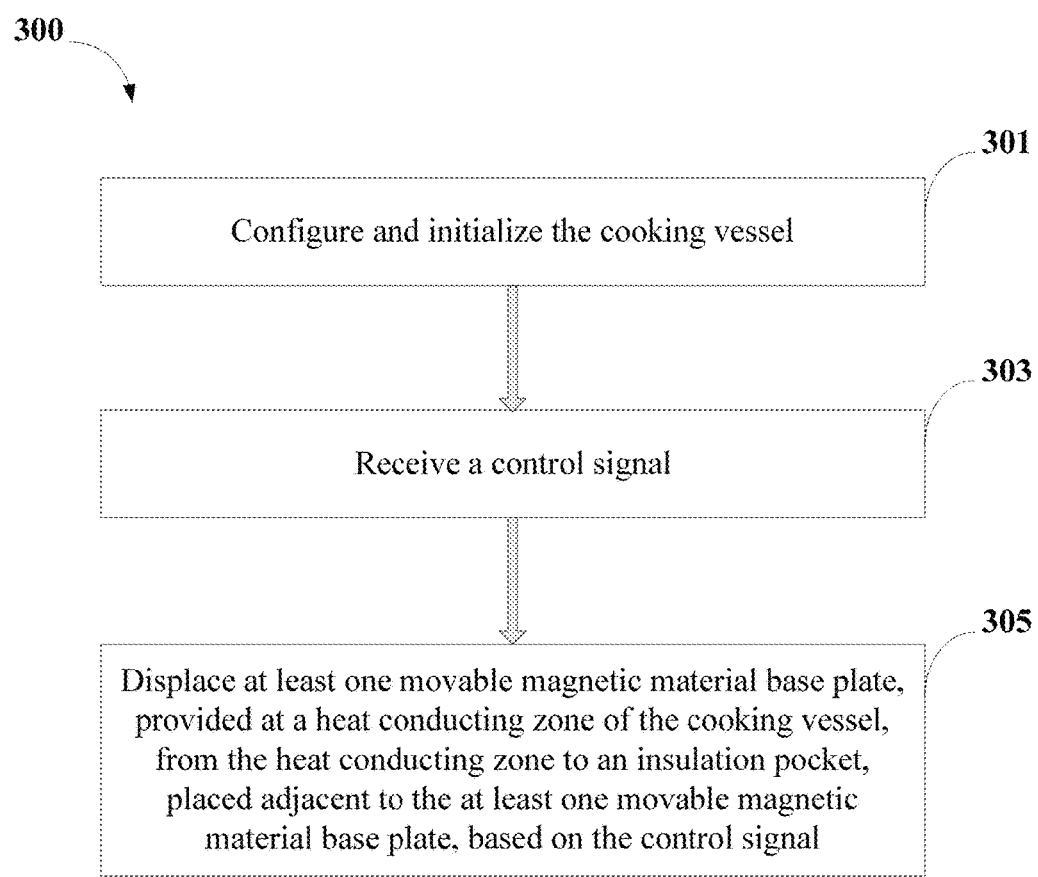
FIG. 3 illustrates a flowchart showing a method of monitoring cooking status in the cooking vessel in accordance with some embodiments of the present disclosure.

FIG. 3 illustrates a flowchart showing a method for monitoring cooking status in a cooking vessel in accordance with some embodiments of the present disclosure.

As illustrated in FIG. 3, the method 300 comprises one or more blocks for monitoring the cooking status in a cooking vessel 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof At block 301, the cooking vessel 101 is configured with one or more configuration parameters. The one or more predefined values, including the predefined threshold level of the contents, the first predefined temperature value 127 and the second predefined temperature value 129 are received and/or set by the user. These predefined values are used by the cooking vessel 101 for monitoring the cooking status of the contents in the cooking vessel 101.

At block 303, an actuator 109 configured in the cooking vessel 101 receives a control signal. The control signal may be received from at least one of the control unit 121 and the one or more switches configured in the cooking vessel 101. The control signal is generated based on the first signal from the level detection sensor 111 placed in the cooking vessel 101 and/or based on the second signal from the temperature sensor 113 placed in the cooking vessel 101. The level detection sensor 111 generates the first signal upon detecting level of contents present in the cooking vessel 101 reaching a predefined threshold level. Similarly, the temperature sensor 113 generates the second signal when temperature value of the contents present in the cooking vessel 101 is higher than a first predefined temperature value 127.

At block 305, the actuator 109, upon receiving the control signal, displaces the at least one movable magnetic material base plate 103 provided at the heat conducting zone of the cooking vessel 101 from the heat conducting zone to the insulation pocket 107. The insulation pocket 107 may be placed adjacent to the at least one movable magnetic material base plate 103. The non-magnetic material base plate 105, placed adjacent to the movable magnetic material base plate 103, stops the transfer of heat from the induction cooktop to the contents when the movable magnetic material base plate 103 is displaced into the insulation pocket 107. Advantages of the Embodiment of the Present Disclosure are Illustrated Herein.

In an embodiment, the present disclosure provides a method and a cooking vessel for automatically monitoring the cooking status of contents being cooked in the cooking vessel.

In an embodiment, the present disclosure provides a method and the cooking vessel for preventing boil over/spillover of the contents present in the cooking vessel during cooking.

In an embodiment, the cooking vessel disclosed in the present disclosure prevents sticking of the contents in the cooking vessel to bottom of the cooking vessel during cooking.

In an embodiment, the present disclosure provides a cooking vessel that requires no manual intervention from the user for cooking and for monitoring the status of the contents being cooked in the cooking vessel.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 101 | Cooking vessel |
| 103 | Movable magnetic material base plate |
| 105 | Non-magnetic material base plate |
| 107 | Insulation pocket |
| 109 | Actuator |
| 111 | Level detection sensor |
| 113 | Temperature sensor |
| 115 | Rotating plate |
| 117 | Motor |
| 121 | Control unit |
| 123 | Memory unit |
| 125 | Data |
| 127 | First predefined temperature value |
| 129 | Second predefined temperature value |
| 131 | Historic temperature values |
| 133 | Other data |
| 135 | User interface |

What is claimed is:

1. A cooking vessel for an induction cooktop, the cooking vessel comprising:
at least one movable magnetic material base plate provided at a bottom of the cooking vessel, wherein the movable magnetic material base plate directly transfers heat from the induction cooktop to contents in the cooking vessel;
an insulation pocket comprising a thermally and electrically non-conductive solid material and configured to house the at least one movable magnetic material base plate, wherein at least a portion of the thermally and electrically non-conductive solid material when housing the at least one movable magnetic material base plate is positioned directly between the at least one movable magnetic material base plate and the induction cooktop to thermally and electrically insulate the at least one movable magnetic material base plate from the induction cooktop;

an actuator configured to displace the at least one movable magnetic material base plate based on a control signal; and at least one non-magnetic material base plate placed adjacent to the at least one movable magnetic material base plate, wherein the non-magnetic material base plate blocks transfer of heat from the induction cooktop to the contents when the actuator displaces the at least one movable magnetic material base plate from directly transferring heat from the induction cooktop to contents in the cooking vessel to the insulation pocket, based on the control signal.

2. The cooking vessel as claimed in claim 1 further comprising a level detection sensor for determining a level of the contents in the cooking vessel, wherein the level detection sensor generates a first signal upon determining the level of the contents reaching a predefined threshold level.

3. The cooking vessel as claimed in claim 2 further comprising a temperature sensor for determining a temperature value of the contents in the cooking vessel, wherein the temperature sensor generates a second signal upon determining the temperature value of the contents in the cooking vessel reaching a first predefined temperature value.

4. The cooking vessel as claimed in claim 3 further comprising a control unit configured to generate the control signal based on at least one of the first signal and the second signal.

5. The cooking vessel as claimed in claim 1 further comprising a rotating plate with vertical protrusions connected to a motor at the bottom of the cooking vessel.

6. The cooking vessel as claimed in claim 5 further comprising the motor connected to the rotating plate, wherein the motor rotates the rotating plate when the temperature value of the contents present in the cooking vessel reaches a second predefined temperature value, thereby stirring the contents present in the cooking vessel.

7. The cooking vessel as claimed in claim 1 further comprising one or more switches that generate the control signal for manual activation of at least one of base plate displacement and stirring of the contents present in the cooking vessel.

8. The cooking vessel as claimed in claim 2, wherein the level detection sensor is moveable along a length of the cooking vessel.

9. The cooking vessel as claimed in claim 1, wherein the insulation pocket is thermally and electrically insulated.

10. The cooking vessel as claimed in claim 1 further comprising one or more Light Emitting Diodes (LED) and a display to represent one or more statuses of the cooking vessel, wherein the one or more statuses comprise at least one of, boil over status, stirring status or position of the at least one movable magnetic material base plate and the at least one non-magnetic material base plate.

11. The cooking vessel as claimed in claim 1 further comprising a user interface to receive user input comprising a first predefined temperature value and a second predefined temperature value.

12. A method for monitoring cooking status in a cooking vessel, the method comprising:

receiving, by an actuator of the cooking vessel, a control signal; and displacing, by the actuator, at least one movable magnetic material base plate from directly transferring heat from an induction cooktop to contents in the cooking vessel to an insulation pocket based on the control signal, wherein the at least one movable magnetic material base plate directly transfers heat from the induction cooktop to contents in the cooking vessel, wherein the insulation pocket comprises a thermally and electrically non-conductive solid material and is configured to house the at least one movable magnetic base plate, wherein at least a portion of the thermally and electrically non-conductive solid material during the displacing is positioned directly between the at least one movable magnetic material base plate and the induction cooktop to thermally and electrically insulate the at least one movable magnetic material base plate from the induction cooktop.

13. The method as claimed in claim 12, wherein the control signal is based on user input.

14. The method as claimed in claim 12 further comprises receiving, by the actuator, the control signal, wherein the control signal is based on a first signal generated by a level detection sensor placed in the cooking vessel, upon detecting a level of contents present in the cooking vessel reaching a predefined threshold level.

15. The method as claimed in claim 12 further comprising receiving by the actuator, the control signal, wherein the control signal is based on a second signal generated by temperature sensor placed in the cooking vessel, when a temperature value of the contents present in the cooking vessel is higher than a first predefined temperature value.

16. The method as claimed in claim 12 wherein the control signal is provided based on a first predefined temperature value, wherein the first predefined temperature value is based on a historic temperature value at which boil over condition of the contents present in the cooking vessel is detected, when the first predefined temperature value is not received from the user.

17. The method as claimed in claim 12, wherein the control signal is based on a second predefined temperature value, wherein the second predefined temperature value is based on a historic temperature value at which stirring of the contents present in the cooking vessel is performed, when the second predefined temperature value is not received from the user.

* * * * *